(12) United States Patent
Tatsuta et al.

(10) Patent No.: US 10,889,149 B2
(45) Date of Patent: Jan. 12, 2021

(54) PNEUMATIC TIRE

(71) Applicant: Sumitomo Rubber Industries, Ltd., Kobe (JP)

(72) Inventors: Masahiro Tatsuta, Kobe (JP); Kozo Yoshimura, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 272 days.

(21) Appl. No.: 16/021,891

(22) Filed: Jun. 28, 2018

(65) Prior Publication Data
US 2019/0009615 A1 Jan. 10, 2019

(30) Foreign Application Priority Data

Jul. 4, 2017 (JP) .................................. 2017-131366

(51) Int. Cl.
| | |
|---|---|
| *B60C 11/03* | (2006.01) |
| *B60C 11/04* | (2006.01) |
| *B60C 11/00* | (2006.01) |
| *B60C 11/12* | (2006.01) |

(52) U.S. Cl.
CPC ...... *B60C 11/0332* (2013.01); *B60C 11/0083* (2013.01); *B60C 11/042* (2013.01); *B60C 11/12* (2013.01); *B60C 11/04* (2013.01); *B60C 2011/036* (2013.01); *B60C 2011/039* (2013.01); *B60C 2011/0344* (2013.01); *B60C 2011/0353* (2013.01); *B60C 2011/0362* (2013.01); *B60C 2011/0381* (2013.01); *B60C 2011/0386* (2013.01); *B60C 2011/1209* (2013.01)

(58) Field of Classification Search
CPC .................................................. B60C 11/0332
See application file for complete search history.

(56) References Cited

U.S. PATENT DOCUMENTS

| | | | |
|---|---|---|---|
| 6,408,908 B1* | 6/2002 | Scarpitti | B60C 11/0083 |
| | | | 152/209.14 |
| 2004/0244895 A1* | 12/2004 | Nguyen | B60C 9/28 |
| | | | 152/209.14 |
| 2009/0008011 A1* | 1/2009 | Jin | B60C 11/00 |
| | | | 152/209.14 |

FOREIGN PATENT DOCUMENTS

| | | |
|---|---|---|
| EP | 1 092 566 A2 | 4/2001 |
| JP | 2005-53268 A | 3/2005 |
| JP | 2012-136188 A | 7/2012 |
| WO | WO 99/14065 A1 | 3/1999 |

OTHER PUBLICATIONS

Extended European Search Report dated Oct. 31, 2018 for Application No. 18179449.6.

* cited by examiner

*Primary Examiner* — Robert C Dye
*Assistant Examiner* — Farah Taufiq
(74) *Attorney, Agent, or Firm* — Birch, Stewart, Kolasch & Birch, LLP (57) ABSTRACT

A pneumatic tire includes a tread portion including a contact patch which occurs when the tire is mounted on a standard wheel rim with a standard pressure and loaded with a certain tire load at zero camber angle. The contact patch, on a respective tire load, defines a ratio Lc/Ls of a crown contact circumferential length Lc at an axial center of the contact patch to a shoulder contact circumferential length Ls at an axial location of 80% of an axial maximum width of the contact patch. The ratio Lc/Ls upon being loaded with 40%, of a standard tire load is equal to or less than 125% of the ratio Lc/Ls upon being loaded with 70% of the standard tire load.

20 Claims, 5 Drawing Sheets

PNEUMATIC TIRE

BACKGROUND ART

Field of the Disclosure

The present disclosure relates to pneumatic tires, and more particularly to a pneumatic tire having an optimized tread contact patch to suppress uneven wear of the tread.

Description of the Related Art

Conventionally, in order to improve uneven wear resistance of tire treads, an attempt has been made to specify a profile of an outer surface of a tire tread in a tire meridian cross-sectional view. For example, the following Patent Literature 1 has been proposed a pneumatic tire having a specified three-dimensional belt layer structure to improve uneven wear resistance of the tread portion.

Unfortunately, the pneumatic tire as disclosed in Patent Literature 1 tends to have a problem that variation in uneven wear resistance thereof occurs according to tire loads. For example, when the pneumatic tire is mounted on a vehicle which has uneven weight balance in front and rear such as a front wheel drive vehicle, there is a possibility that uneven wear progresses quickly on either one side of front or rear wheel tires.

PATENT LITERATURE 1

Japanese Unexamined Patent Application Publication 2012-136188

SUMMARY OF THE INVENTION

In view of the above problems in the conventional art, the present disclosure has an object to provide a pneumatic tire capable of suppressing uneven wear of the tread portion.

According to one aspect to the disclosure, a pneumatic tire includes a tread portion including a contact patch which occurs when the tire is mounted on a standard wheel rim with a standard pressure and loaded with a certain tire load at zero camber angle. The contact patch, on a respective tire load, defines a ratio Lc/Ls of a crown contact circumferential length Lc at an axial center of the contact patch to a shoulder contact circumferential length Ls at an axial location of 80% of an axial maximum width of the contact patch. The ratio Lc/Ls upon being loaded with 40% of a standard tire load is equal to or less than 125% of the ratio Lc/Ls upon being loaded with 70% of the standard tire load.

In another aspect of the disclosure, the ratio Lc/Ls may be in a range of from 120% to 150% when the tire load is in a range of from 40% to 70% of the standard tire load.

In another aspect of the disclosure, the tread portion may further include a circumferentially and continuously extending crown main groove arranged on a tire equator and a circumferentially and continuously extending shoulder main groove arranged between the crown main groove and a tread edge to define a middle land portion between the crown main groove and the shoulder main groove, and a shoulder land portion between the shoulder main groove and the tread edge. On the contact patch upon being loaded with 40% of the standard tire load, an axial contact width of the shoulder land portion may be in a range of from 130% to 140% of an axial contact width of the middle land portion.

In another aspect of the disclosure, the tread portion, in a tire meridian cross-sectional view, may include a profile including a plurality of circular arcs having different radii of curvature. The profile may include a crown circular arc straddling the tire equator and protruding radially outwardly with a first radius of curvature TR1, a middle circular arc connected to the crown circular arc and protruding radially outwardly with a second radius of curvature TR2, and a shoulder circular arc connected to the middle circular arc and protruding radially outwardly with a third radius of curvature TR3. The middle circular arc may be connected to the crown circular arc at a first connecting portion located on the middle land portion, and the shoulder circular arc may be connected to the middle circular arc at a second connecting portion located on the shoulder land portion.

In another aspect of the disclosure, the first radius of curvature TR1, the second radius of curvature TR2, and the third radius of curvature TR3 may satisfy the following relation:

$$TR1 > TR2 > TR3.$$

In another aspect of the disclosure, the second radius of curvature TR2 may be in a range of from 45% to 60% of the first radius of curvature TR1, and the third radius of curvature TR3 may be in a range of from 15% to 30% of the first radius of curvature TR1.

In another aspect of the disclosure, the first connecting portion may be located within 2 mm from an axial center of the middle land portion, and the second connecting portion may be located axially outwardly from an axially inner end of the shoulder land portion of from 5 to 10 mm.

In another aspect of the disclosure, the tread portion may further be provided with a belt layer. The belt layer may include an inner belt ply and an outer belt ply in a tire radial direction, and an axial width of the outer belt ply may be equal to or more than 60% of a tread width.

DESCRIPTION OF THE PREFERRED EMBODIMENTS

An embodiment of the present invention will be explained below with reference to the accompanying drawings.

Figure 1:
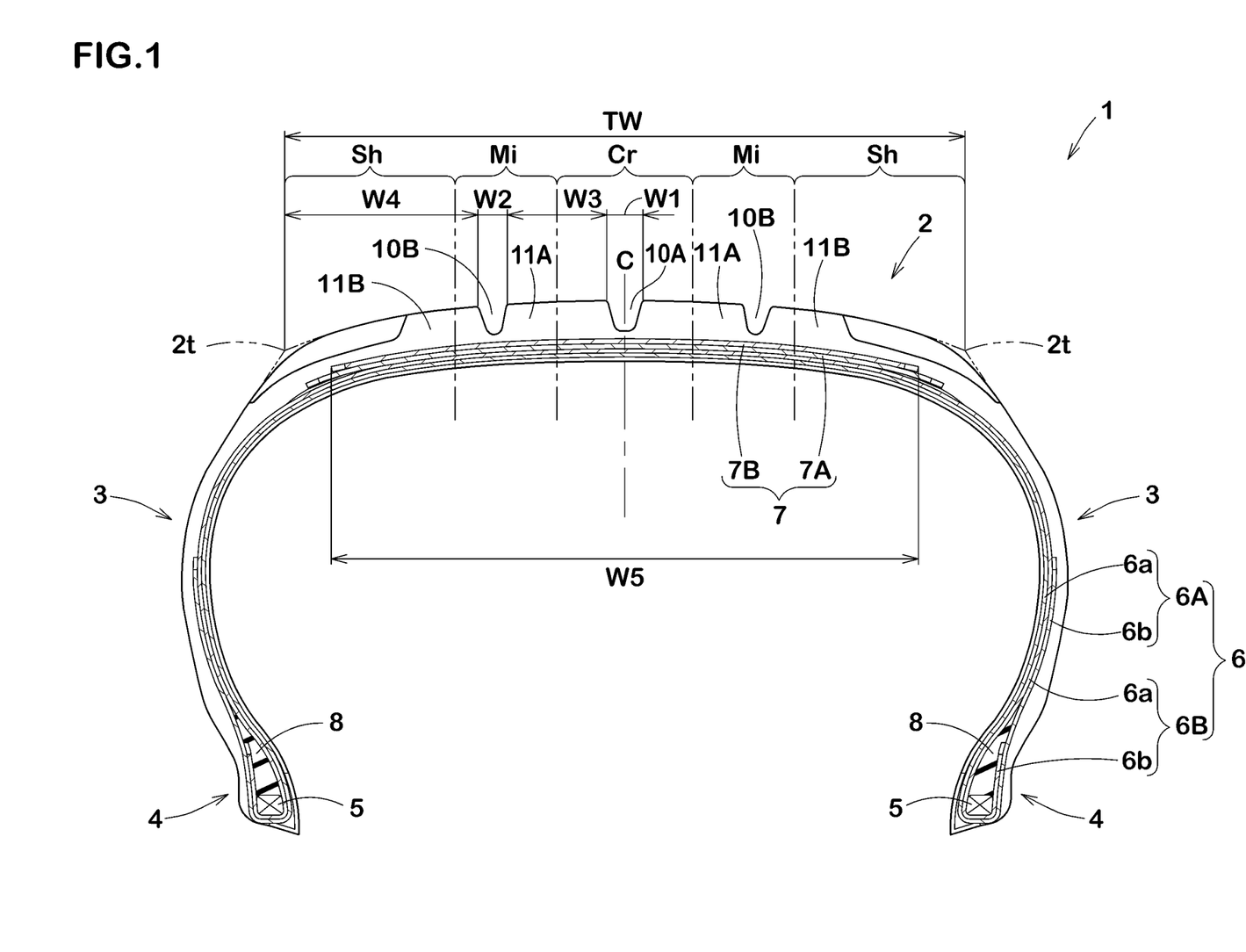
FIG. 1 is a cross-sectional view of a pneumatic tire in accordance with an embodiment of the present disclosure.

FIG. 1 illustrates a cross-sectional view of a pneumatic tire 1 under a standard condition in accordance with an embodiment of the present disclosure.

As used herein, the standard condition of the tire 1 is such that the tire 1 is mounted onto a standard wheel rim (not illustrated) and inflated to a standard pressure but loaded with no tire load. In this application including specification and claims, various dimensions, positions and the like of the tire 1 refer to those under the standard condition of the tire 1 unless otherwise noted.

As used herein, the standard wheel rim is a wheel rim officially approved or recommended for the tire 1 by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire 1 by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger car tires, however, the standard pressure is defined as 180 kPa.

As illustrated in FIG. 1, the tire 1 in accordance with the present disclosure is embodied as a radial tire for passenger car, suitably. The tire 1 includes a tread portion 2 to form a contact patch when the tire is in contact with the ground. The tread portion 2, for example, includes a crown region Cr including the tire the tire equator C, two axially spaced shoulder regions Sh each including the corresponding tread edge 2t, and two axially spaced middle regions Mi located between the crown region Cr and the shoulder regions Sh on each side of the tire equator C.

As used herein, the tread edges 2t refer to axially outermost edges of a contact patch of the tread portion 2 which occurs under a standard loaded condition at zero camber angle. As used herein, the standard loaded condition of the tire 1 is such that the tire 1 is mounted onto the standard wheel rim and inflated to the standard pressure and pushed onto a flat plane with a standard tire load. Note that the tire equator C is on the center location between the tread edges 2t, and that an axial distance between the tread edge 2t is defined as the tread width TW.

As used herein, the standard tire load is a tire load officially approved or recommended for the tire 1 by standards organizations, wherein the standard tire load is the "maximum load capacity" in JATMA, the "Load Capacity" in ETRTO, and the maximum value given in the above-mentioned table in TRA or the like.

In this embodiment, the tire 1 includes a carcass 6 extending between bead cores 5 of bead portions 4 through sidewall portions 3 and the tread portion 2, and a belt layer 7 disposed radially outwardly of the carcass 6 in the tread portion 2.

The carcass 6 includes one or more carcass plies 6A and 6B (two in this embodiment). Each of the carcass plies 6A and 6B includes carcass cords (not illustrated) oriented at angles of from 75 to 90 degrees with respect to the tire circumferential direction, for example. As to the carcass cords, for example, organic fiber cords, e.g. polyester, aromatic polyamide, rayon and the like can be employed.

In this embodiment, each of the carcass plies 6A and 6B includes a main portion 6a extending between the bead cores 5 of the bead portions 4 through the sidewall portions 3 and the tread portion 2, and a pair of turned-up portions 6b each turned up around the corresponding bead core 5 from axially inside to the outside of the tire. A pair of tapered bead apex rubber 8 extending radially outwardly from the corresponding bead core 5 is disposed between the main portion 6a and the corresponding turned-up portion 6b of each carcass ply 6A and 6B.

The belt layer 7 includes one or more belt plies (two in this embodiment). The belt plies, for example, includes a radially inner belt ply 7A on the carcass side and a radially outer belt ply 7B disposed radially outwardly of the inner belt ply 7A.

Preferably, an axial width W5 of the outer belt ply 7B is equal to or more than 60% of the tread width TW. In case of a tire 1 having a low aspect ratio equal to or less than 55%, the axial width W5 of the outer belt ply 7B is preferably equal to or more than 70% of the tread width TW.

The outer belt ply 7B can improve rigidity in the shoulder regions Sh of the tread portion 2 to reduce the ground contact pressure of the shoulder regions Sh so that the ground contact pressure difference between the crown region Cr and each shoulder region Sh makes small. Thus, uneven wear of the tire 1 can be suppressed.

Preferably, each of the belt plies 7A and 7B includes belt cords (not illustrated) oriented at angles of from 10 to 35 degrees with respect to the tire circumferential direction. In this embodiment, the inner belt ply 7A and the outer belt ply 7B are overlapped such that each ply belt cord crosses with each other.

As to the belt cords, e.g. steel, aromatic polyamide, rayon and the like can preferably be employed. Although two belt plies 7A and 7B in this embodiment are used for the belt layer 7, the belt layer 7 can be configured using three or more belt plies. In this case, the outer belt ply 7B shall mean the radially outermost ply in the belt plies.

Figure 2:
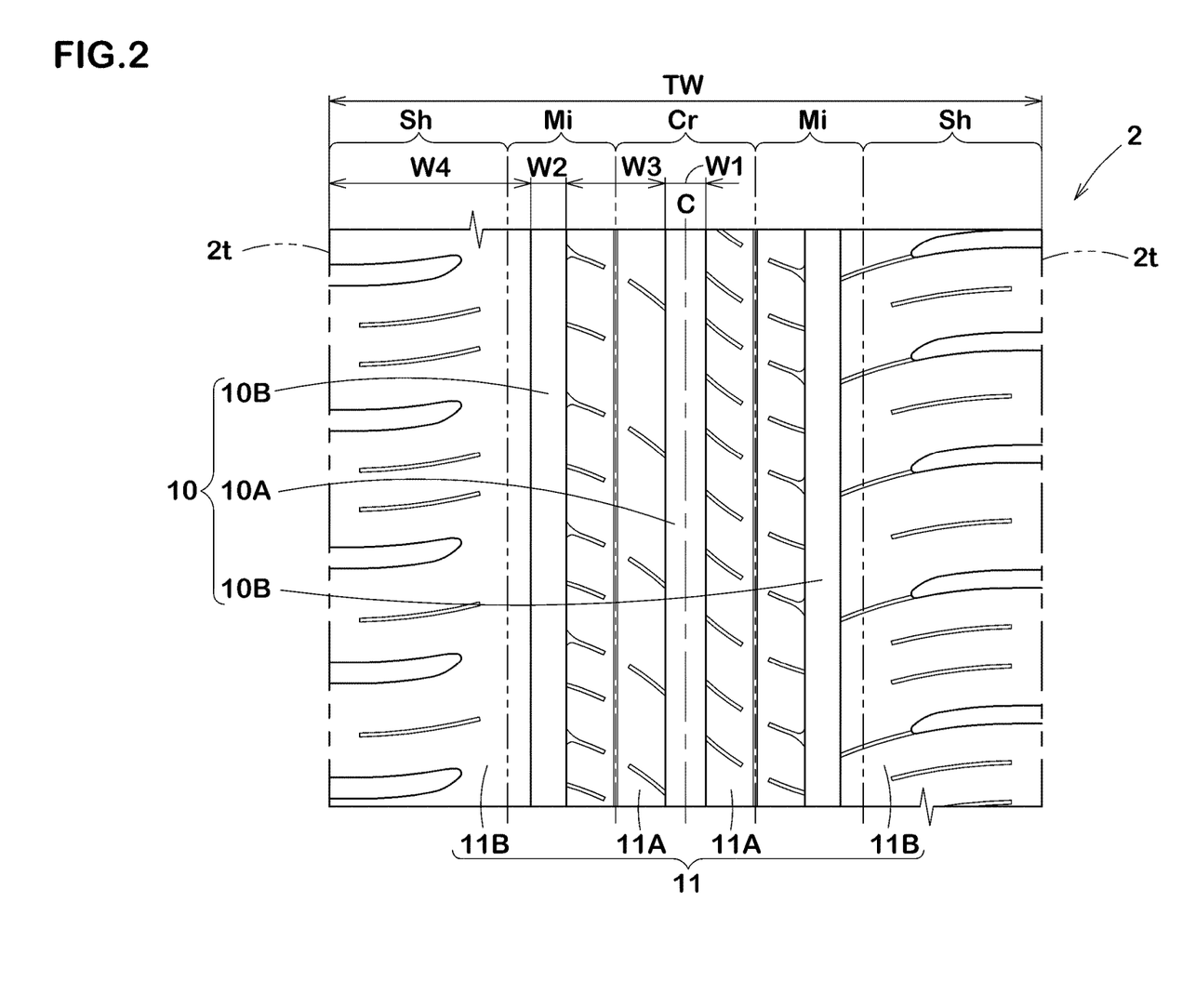
FIG. 2 is a development view of a tread portion of FIG. 1.

FIG. 2 illustrates a development view of the tread portion 2 of FIG. 1. As illustrated in FIG. 2, the tread portion 2 in accordance with the present disclosure is provided with a plurality of circumferentially and continuously extending main grooves 10 and a plurality of land portions 11 divided by the main grooves 10.

In this embodiment, the main grooves 10 include a crown main groove 10A arranged on the tire equator C and two shoulder main grooves 10B each arranged between the crown main groove 10A and each tread edge 2t.

Preferably, the crown main groove 10A has a substantially constant groove width W1 and extends in a straight manner. Preferably, the groove width W1 of the crown main groove 10A may be in a range of from 5% to 7% of the tread width TW. In this embodiment, the crown main groove 10A is arranged on the crown region Cr. Note that a groove width of a groove is measured along a direction perpendicular to the longitudinal direction of the groove unless otherwise noted.

Preferably, the shoulder main grooves 10B each have a substantially constant groove width W2 and extend in a straight manner. Preferably, the groove width W2 of each shoulder main groove 10B may be in a range of from 4% to 6% of the tread width TW. Preferably, the groove width W2 of each shoulder main groove 10B is smaller than the groove width W1 of the crown main groove 10A. In this embodiment, the shoulder main grooves 10B are arranged on the respective middle regions Mi.

In this embodiment, the land portions 11 include two middle land portions 11A each of which is defined between the crown main groove 10A and the corresponding shoulder main groove 10B, and two shoulder land portions 11B which are defined between the shoulder main grooves 10B and the tread edges 2t.

Preferably, axial widths W3 of the middle land portions 11A are in a range of from 10% to 20% of the tread width TW. Preferably, axial widths W4 of the shoulder land portions 11B are in a range of from 25% to 35% of the tread width TW. The axial widths W4 of the shoulder land portion 11B are preferably greater than the axial widths W3 of the middle land portions 11A. Preferably, the axial widths W4 of the shoulder land portions 11B are in a range of from 150% to 250% of the middle land portion 11A.

Figure 3:
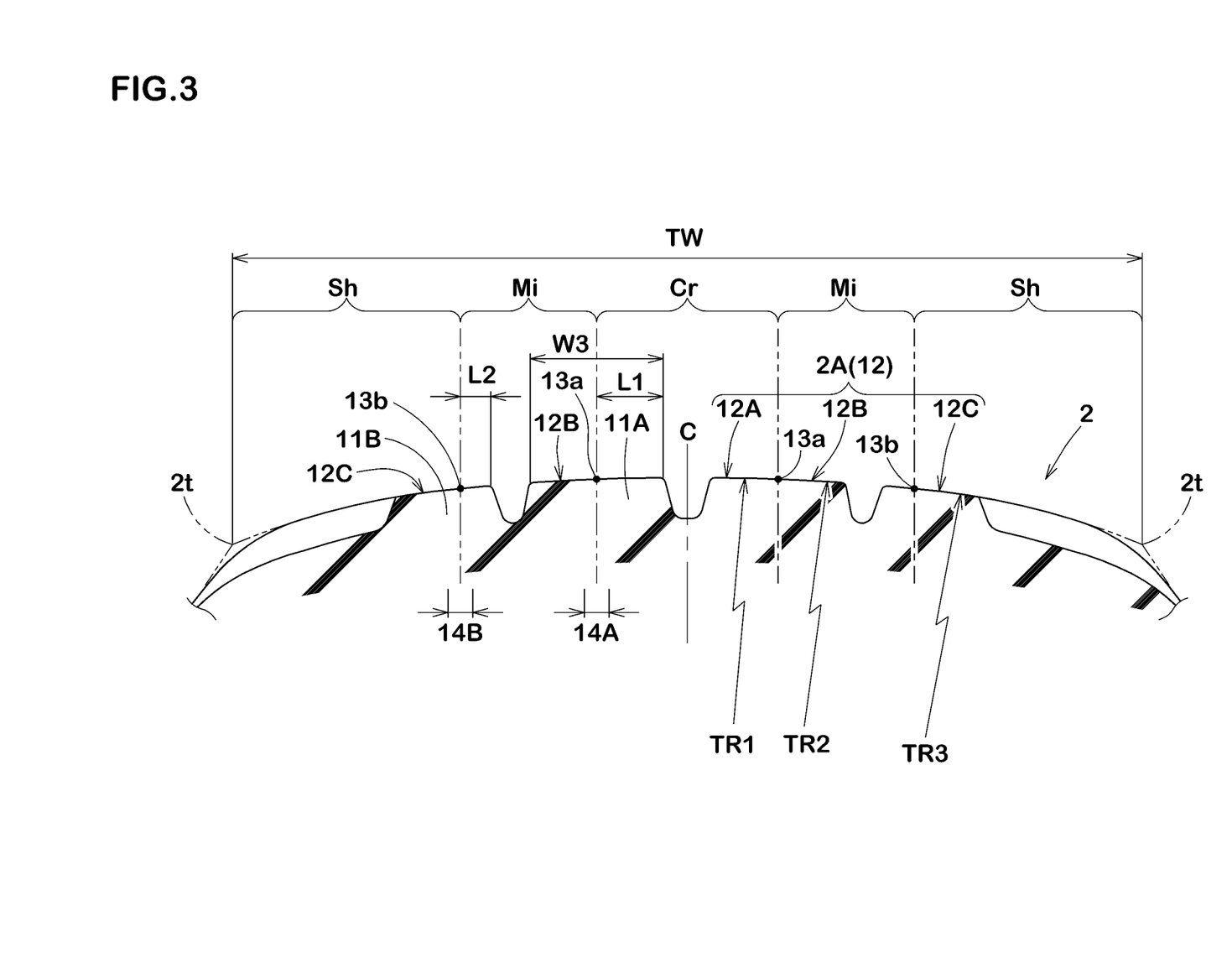
FIG. 3 is a partial enlarged view of the tread portion of FIG. 1 for illustrating a profile.

FIG. 3 illustrates a partial enlarged view of the tread portion 2 of FIG. 1 for illustrating a profile 12 thereof. As illustrated in FIG. 3, in a tire meridian cross-sectional view, an outer surface 2A of the tread portion 2 has the profile 12 which includes a plurality of circular arcs having different radii of curvature. In this embodiment, the profile 12 includes a crown circular arc 12A, a pair of middle circular arcs 12B, and a pair of shoulder circular arcs 12C. The tread portion 2 having such a profile 12 can reduce ground contact pressure acting on the shoulder land portions 11B, resulting in suppressing uneven wear of the tread portion 2.

In this embodiment, the crown circular arc 12A forms an outer surface of the crown region Cr of the tread portion 2, the pair of middle circular arcs 12B form outer surfaces of the pair of middle regions Mi, and the pair of shoulder circular arcs 12C forms outer surfaces of the pair of shoulder regions Sh. In this embodiment, the outer surfaces of the crown region Cr, the middle regions Mi and the shoulder regions Sh are configured as circular arcs which are different radii of curvature from one another. Furthermore, each of the different radii of curvature is configured as a single circular arc, for example.

The crown circular arc 12A is arranged so as to straddle the tire equator C and protrudes radially outwardly with a first radius of curvature TR1.

The middle circular arcs 12B are connected to the crown circular arc 12A on axially both sides of the crown circular arc 12A and protrude radially outwardly with a second radius of curvature TR2. In this embodiment, the middle circular arcs 12B are connected to the crown circular arc 12A at respective first connecting portions 13a located on the outer surface of the respective middle land portions 11A.

The shoulder circular arcs 12C are connected to axially outer sides of the respective middle circular arcs 12B and protrude radially outwardly with a third radius of curvature TR3. In this embodiment, the shoulder circular arcs 12C are connected to the respective middle circular arcs 12B at respective second connecting portions 13b located on the outer surface of the respective shoulder land portions 11B.

In the profile 12 according to the embodiment, since the first radius of curvature TR1, the second radius of curvature TR2, and the third radius of curvature TR3 are different from one another, the tread portion 2 has a multi-radius profile.

In order to suppress uneven wear of the tread portion further by obtaining a smooth continuous tread profile of the crown circular arc 12A, a middle circular arc 12B and the shoulder circular arc 12C, the first radius of curvature TR1, the second radius of curvature TR2 and the third radius of curvature TR3 preferably satisfy the following relation:

TR1>TR2>TR3.

Preferably, the second radius of curvature TR2 is in a range of from 45% to 60% of the first radius of curvature TR1. When the second radius of curvature TR2 exceeds 60% of the first radius of curvature TR1, ground contact pressure acting on the shoulder land portions 11B tends to increase, and thus the shoulder land portions 11B may be worn quickly prior to the middle land portions 11A. When the second radius of curvature TR2 is less than 45% of the first radius of curvature TR1, a slip may occur on the shoulder land portions 11B upon traveling, and thus heel and toe wear may be generated on the shoulder land portions 11B. In view of the above, the second radius of curvature TR2 is preferably in a range of from 50% to 55% of the first radius of curvature TR1.

Preferably, the third radius of curvature TR3 is in a range of from 15% to 30% of the first radius of curvature TR1. When the third radius of curvature TR3 exceeds 30% of the first radius of curvature TR1, ground contact pressure acting on the shoulder land portions 11B tends to increase, and thus the shoulder land portions 11B may be worn quickly prior to the middle land portions 11A. When the third radius of curvature TR3 is less than 15% of the first radius of curvature TR1, a slip may occur on the shoulder land portions 11B upon traveling, and thus heel and toe wear may be generated on the shoulder land portions 11B. In view of the above, the third radius of curvature TR3 is preferably in a range of from 20% to 25% of the first radius of curvature TR1.

In this embodiment, the first connecting portions 13a where the crown circular arcs 12A are connected to the respective middle circular arcs 12B are located on the respective middle land portions 11A. This structure makes it possible to optimize the ground contact pressure acting on the middle land portions 11A and the shoulder land portions 11B, resulting in suppressing uneven wear of the tread portion 2.

Preferably, each of the first connecting portions 13a is located on a first region 14A which is a region within an axial distance of 2 mm from an axial center of the corresponding middle land portion 11A. That is, the axial distance L1 between the first connecting portion 13a and the axially inner end of the middle land portion 11A is in a range of from (0.5*W3−2) to (0.5*W3+2) mm, wherein W3 is the axial width W3 of the middle land portion 11A. The first connecting portion 13a as such may be useful to shape a better profile 12, resulting in suppressing uneven wear of the tread portion 2.

In this embodiment, the second connecting portions 13b where the middle circular arcs 12B are connected to the respective shoulder circular arcs 12C are on the respective shoulder land portion 11B. This structure makes it possible to optimize the ground contact pressure acting on the middle land portions 11A and the shoulder land portions 11B, resulting in suppressing uneven wear of the tread portion 2.

Preferably, each of the second connecting portions 13b is located on a second region 14B which is a region axially outwardly from an axially inner end of the corresponding shoulder land portion 11B of from 5 to 10 mm. That is, an axial distance L2 between the second connecting portion 13b and the axially inner end of the shoulder land portion 11B is preferably in a range of from 5 to 10 mm. The second connecting portion 13b as such may be useful to shape a better profile 12, resulting in suppressing uneven wear of the tread portion 2.

Next, referring to FIGS. 4 and 5, a contact patch 15 of the tread portion 2 which occurs when the tire 1 is mounted onto the standard wheel rim (not illustrated) with the standard pressure and pushed onto a flat plane with a tire load of from 40% to 70% of the standard tire load will be explained. The shape of the contact patch 15, for example, may be adjusted by changing the profile 12 and rubber material of the tread portion 2.

In this embodiment, the contact patch 15 defines an axial maximum width Wm thereof, a crown contact circumferential length Lc at the axial center of the contact patch, and a shoulder contact circumferential length Ls at an axial location of 80% of the axial maximum width Wm. Since the shape of the contact patch 15 varies according to the tire load condition, these parameters also vary according to the tire load condition. Thus, the contact patch 15 defines the respective ratios of Lc/Wm and Lc/Ls on the respective tire load conditions. The following dimensions of the shape of the contact patch 15 are values when the tire 1 held in the standard condition is loaded with a tire load of from 40% to 70% of the standard tire load.

Note that a tire load of 40% of the standard tire load, for example, approximates a load which acts on each rear wheel of a front wheel drive vehicle, and that a tire load of 70%/o of the standard tire load, for example, approximates a load which acts on each front wheel of a front wheel drive vehicle.

Figure 4:
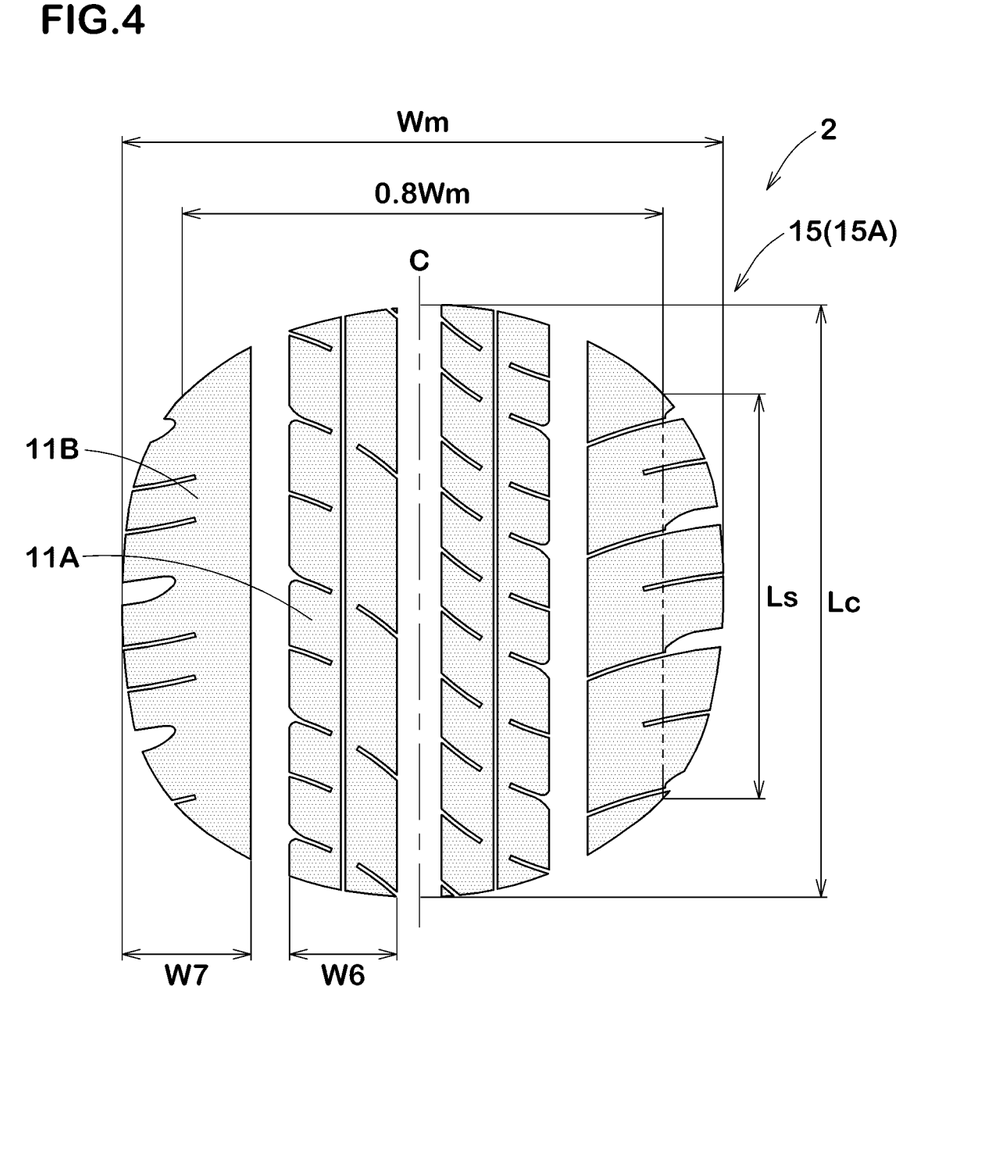
FIG. 4 is a shape of contact patch of the tread portion when the tire is loaded with 40% of a standard tire load.

FIG. 4 illustrates the contact patch 15 of the tread portion 2 when the tire 1 is loaded with 40% of the standard tire load (hereinafter, referred to as "40% contact patch 15A"). As illustrated in FIG. 4, the 40% contact patch 15A, for example, has an about circular shape as a whole.

Preferably, in the shape of 40% P contact patch 15A, the ratio Lc/Wm of the crown contact circumferential length Lc at an axial center of the 40% contact patch to the axial maximum width Wm is in a range of from 95% to 105%. Preferably, the axial maximum width Wm of the 40% contact patch 15A is in a range of from 70% to 85% of the tread width TW. The tread portion 2 having the 40% contact patch 15A as such can suppress uneven wear of the tread portion 2 at a low tire-load condition, e.g. a tire being mounted on a rear wheel of a front wheel drive vehicle.

Preferably, on the 40% contact patch 15A, the ratio Lc/Ls of the crown contact circumferential length Lc to the shoulder contact circumferential length Ls at the axial location of 80% of the axial maximum width Wm (0.8 Wm) is in a range of from 120% to 150%. The tread portion 2 having the 40% contact patch 15A as such can suppress uneven wear of the tread portion 2 in both tire axial and circumferential directions at a low tire-load condition in a well-balanced manner.

When the ratio Lc/Ls of the 40% contact patch 15A is less than 120%, ground contact pressure acting on the shoulder land portions 11B tends to increase, and thus the shoulder land portions 11B may be worn quickly prior to the middle land portions 11A. When the ratio Lc/Ls of the 40% contact patch 15A exceeds 150%, a slip may occur on the shoulder land portions 11B upon traveling, and thus heel and toe wear may be generated on the shoulder land portions 11B.

Preferably, ground contact widths W7 of the shoulder land portions 11B on the 40% contact patch 15A are in a range of from 130% to 140% of the ground contact widths W6 of the middle land portions 11A. The 40% contact patch 15A as such can optimize ground contact pressure acting on the middle land portions 11A and the shoulder land portions 11B upon a low tire-load condition, resulting in suppressing uneven wear of the tread portion 2 and deterioration of steering stability.

Figure 5:
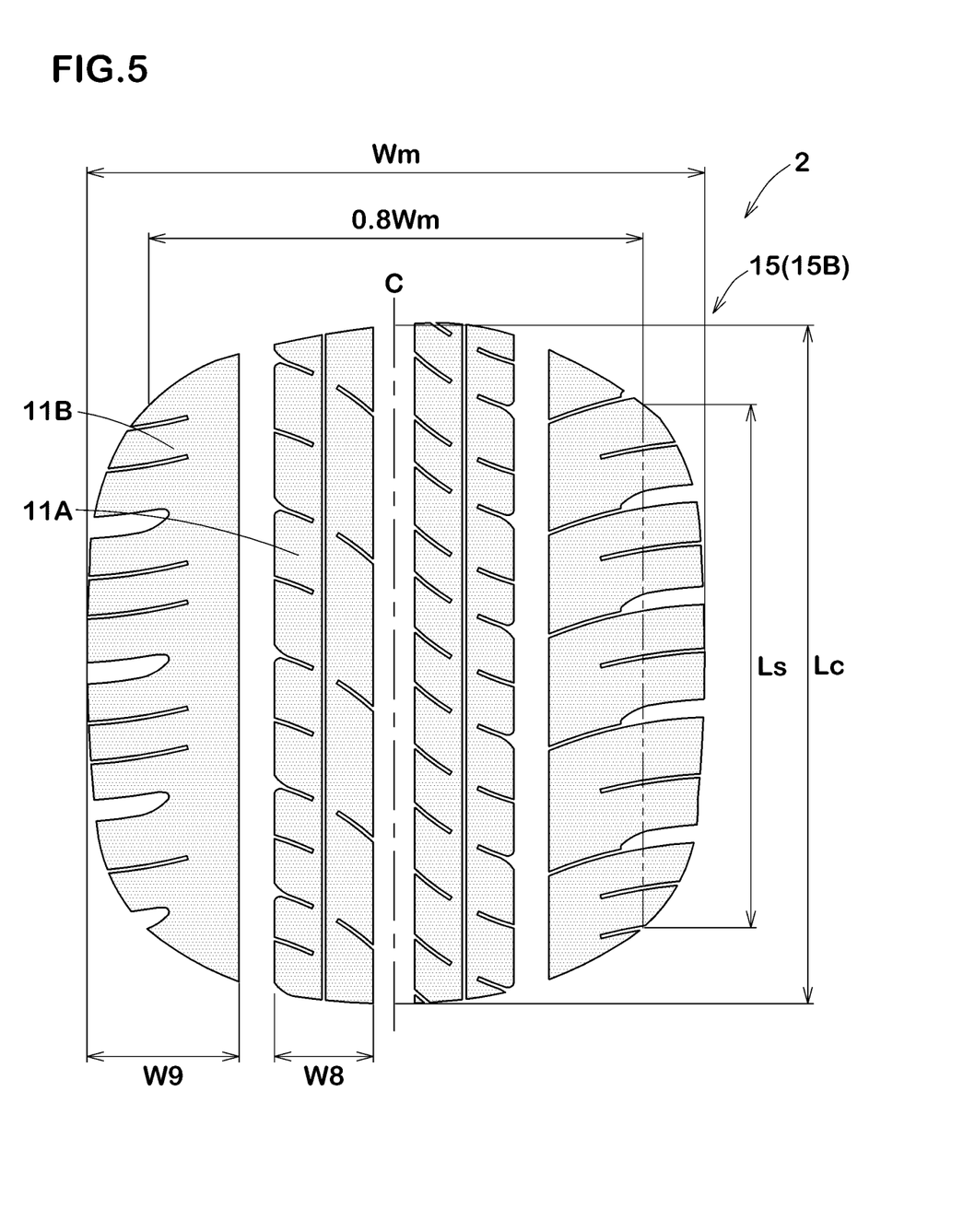
FIG. 5 is a shape of contact patch of the tread portion when the tire is loaded with 70% of the standard tire load.

FIG. 5 illustrates the contact patch 15 of the tread portion 2 when the tire 1 is loaded with 70% of the standard tire load (hereinafter, referred to as "70% contact patch 15B"). As illustrated in FIG. 5, the 70% contact patch 15B, for example, has an about oval shape which is long in the tire circumferential direction, as a whole.

Preferably, on the shape of 70% contact patch 15B, the ratio Lc/Wm of the crown contact circumferential length Lc at the axial center of the 70% contact patch to the axial maximum width Wm is in a range of from 105% to 115%. Preferably, the axial maximum width Wm of the 70% contact patch 15B is in a range of from 80% to 95% of the tread width TW. The tread portion 2 having the 70% contact patch 15B as such can suppress uneven wear of the tread portion 2 at a high tire-load condition, e.g. a tire being mounted on a front wheel of a front wheel drive vehicle.

Preferably, on the 70% contact patch 15B, the ratio Lc/Ls of the crown contact circumferential length Lc to the shoulder contact circumferential length Ls at the axial location of 80% of the axial maximum width Wm (0.8 Wm) is in a range of from 120% to 150% as with the 40% contact patch 15A. The tread portion 2 having the 70% contact patch 15B as such can suppress uneven wear of the tread portion 2 in both tire axial and circumferential directions at a high tire-load condition in a well-balanced manner.

When the ratio Lc/Ls of the 70% contact patch 15B is less than 120%, ground contact pressure acting on the shoulder land portions 11B tends to increase, the shoulder land portions 11B may be worn quickly prior to the middle land portions 11A. When the ratio Lc/Ls of the 70% S contact patch 15B exceeds 150%, a slip may occur on the shoulder land portions 11B upon traveling, and thus heel and toe wear may be generated on the shoulder land portions 11B.

Preferably, on the 70% e contact patch 15B, ground contact widths W9 of the shoulder land portions 11B are in a range of from 150% to 160% of the ground contact widths W8 of the middle land portions 11A. The 70% contact patch 15B as such can optimize ground contact pressure acting on the middle land portions 11A and the shoulder land portions 11B upon a high tire-load condition, resulting in suppressing uneven wear of the tread portion 2 and deterioration of steering stability.

In FIG. 4 and FIG. 5, as the shapes of the contact patches 15, ratios Lc/Ls of the 40% contact patch 15A and the 70% contact patch 15B are illustrated. Preferably, the ratio Lc/Ls may be in a range of from 120% to 150% when the tire load is in a range of from 40% to 70% of the standard tire load.

The ratio Lc/Ls of the 40% contact patch 15A is less than 125% of the ratio Lc/Ls of the 70% contact patch 15B. In the tread portion 2 having such an optimize contact patch 15, the ratio Lc/Ls varies in small between a high tire-load condition and a low tire-load condition, resulting in suppressing uneven wear of the tread portion 2 regardless a tire load.

While the particularly preferable embodiments in accordance with the present disclosure have been described in detail, the present disclosure is not limited to the illustrated embodiments but can be modified and carried out in various aspects.

Example

Tires with the tread pattern as shown in FIG. 2 were manufactured by way of trial based on the specification in Table 1. These test tires were mounted on a test vehicle as the all wheels, and then uneven wear resistance thereof was tested. The common specification and the testing method of the test tires are as follows.

Test vehicle: Japanese middle-sized passenger car (front wheel drive car)

Tire size: 195/65R15

Rim size: 15×6.0 J

Inner pressure: 230 kPa

Uneven Wear Resistance Test:

After the test vehicle was made to run for 15,000 kin, a wear amount of the axially inner end of one of the middle land portions (Cr wear amount) and a wear amount of one of the shoulder land portions at the 80% location of the tread width (Sh wear amount) were measured. The test results are shown in Table 1 using a ratio of the Sn wear amount to the Cr wear amount, wherein the nearer the values to 100%, the better the uneven wear resistance is.

Table 1 shows the test results.

TABLE 1

|  | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| Ratio Lc/Ls (%) on 40% contact patch | 155 | 135 | 135 | 150 | 155 | 135 | 135 | 135 | 135 |
| Ratio Lc/Ls (%) on 70% contact patch | 115 | 105 | 130 | 120 | 130 | 115 | 130 | 130 | 130 |
| Ratio Lc/Ls on 40% contact patch/ratio Lc/Ls on 70% contact patch (%) | 135 | 129 | 104 | 125 | 119 | 117 | 104 | 104 | 104 |
| Ratio W7/W6 (%) of shoulder land portion contact width W7 to middle land porition contact width W6 on 40% contact patch | 135 | 135 | 135 | 135 | 135 | 135 | 125 | 145 | 135 |
| Ratio W9/W8 (%) of shoulder land portion contact width W9 to middle land portion contact width W8 on 70% contact patch | 155 | 155 | 155 | 155 | 155 | 155 | 155 | 155 | 145 |
| Ratio L1/W3 (%) of distance L1 between first connecting portion and inner end of middle land portion to middle land portion width W3 | 50 | 50 | 50 | 50 | 50 | 50 | 50 | 50 | 50 |
| Distance L2 (mm) between second connecting portion and inner end of shoulder land portion | 7 | 7 | 7 | 7 | 7 | 7 | 7 | 7 | 7 |
| Ratio TR2/TR1 (%) of second radius of curvature TR2 to first radius of curvature TR1 | 50 | 50 | 50 | 50 | 50 | 50 | 50 | 50 | 50 |
| Ratio TR3/TR1 (%) of third radius of curvature TR3 to first radius of curvature TR1 | 20 | 20 | 20 | 20 | 20 | 20 | 20 | 20 | 20 |
| Ratio W5/TW (%) of outer belt layer width W5 to tread width TW | 70 | 70 | 70 | 70 | 70 | 70 | 70 | 70 | 70 |
| Uneven wear resistanc (ratio Sh wear amount/Cr wear amount) (%) | 150 | 145 | 100 | 125 | 135 | 130 | 140 | 130 | 135 |

|  | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Ratio Lc/Ls (%) on 40% contact patch | 135 | 135 | 135 | 135 | 135 | 135 | 135 | 135 | 135 |
| Ratio Lc/Ls (%) on 70% contact patch | 130 | 130 | 130 | 130 | 130 | 130 | 130 | 130 | 130 |
| Ratio Lc/Ls on 40% contact patch/ratio Lc/Ls on 70% contact patch (%) | 104 | 104 | 104 | 104 | 104 | 104 | 104 | 104 | 104 |
| Ratio W7/W6 (%) of shoulder land portion contact width W7 to middle land porition contact width W6 on 40% contact patch | 135 | 135 | 135 | 135 | 135 | 135 | 135 | 135 | 135 |
| Ratio W9/W8 (%) of shoulder land portion contact width W9 to middle land portion contact width W8 on 70% contact patch | 165 | 155 | 155 | 155 | 155 | 155 | 155 | 155 | 155 |
| Ratio L1/W3 (%) of distance L1 between first connecting portion and inner end of middle land portion to middle land portion width W3 | 50 | 110 | 50 | 50 | 50 | 50 | 50 | 50 | 50 |
| Distance L2 (mm) between second connecting portion and inner end of shoulder land portion | 7 | 7 | 12 | 7 | 7 | 7 | 7 | 7 | 7 |
| Ratio TR2/TR1 (%) of second radius of curvature TR2 to first radius of curvature TR1 | 50 | 50 | 50 | 65 | 40 | 50 | 50 | 50 | 50 |
| Ratio TR3/TR1 (%) of third radius of curvature TR3 to first radius of curvature TR1 | 20 | 20 | 20 | 20 | 20 | 35 | 10 | 20 | 20 |
| Ratio W5/TW (%) of outer belt layer width W5 to tread width TW | 70 | 70 | 70 | 70 | 70 | 70 | 70 | 55 | 80 |
| Uneven wear resistanc (ratio Sh wear amount/Cr wear amount) (%) | 125 | 140 | 135 | 130 | 135 | 130 | 140 | 125 | 95 |

From the test results, it is confirmed that the example tires have superior uneven resistance compared to the referenced tires.

What is claimed is:

1. A pneumatic tire comprising:
   a tread portion comprising a contact patch which occurs when the tire is mounted on a standard wheel rim with a standard pressure and loaded with a certain tire load at zero camber angle; and
   the contact patch, on a respective tire load, defining a ratio Lc/Ls of a crown contact circumferential length Lc at an axial center of the contact patch to a shoulder contact circumferential length Ls at an axial location of 80% of an axial maximum width of the contact patch, wherein the ratio Lc/Ls upon being loaded with 40% of a standard tire load is equal to or less than 125% of the ratio Lc/Ls upon being loaded with 70% of the standard tire load,
   the ratio Lc/Ls upon being loaded with 40% of the standard tire load is in a range of 120% to 150%, and the ratio Lc/Ls upon being loaded with 70% of the standard tire load is in a range of 120% to 150%.

2. The pneumatic tire according to claim 1,
   the tread portion further comprising a circumferentially and continuously extending crown main groove arranged on a tire equator and a circumferentially and continuously extending shoulder main groove arranged between the crown main groove and a tread edge to define a middle land portion between the crown main groove and the shoulder main groove, and a shoulder land portion between the shoulder main groove and the tread edge, and
   on the contact patch upon being loaded with 40% of the standard tire load, an axial contact width of the shoulder land portion being in a range of from 130% to 140% of an axial contact width of the middle land portion.

3. The pneumatic tire according to claim 2,
   wherein the tread portion, in a tire meridian cross-sectional view, comprises a profile comprising a plurality of circular arcs having different radii of curvature, the profile comprising a crown circular arc straddling the tire equator and protruding radially outwardly with a first radius of curvature TR1, a middle circular arc connected to the crown circular arc and protruding radially outwardly with a second radius of curvature TR2, and a shoulder circular arc connected to the middle circular arc and protruding radially outwardly with a third radius of curvature TR3, the middle circular arc being connected to the crown circular arc at a first connecting portion located on the middle land portion, and the shoulder circular arc being connected to the middle circular arc at a second connecting portion located on the shoulder land portion.

4. The pneumatic tire according to claim 3,
wherein the first radius of curvature TR1, the second radius of curvature TR2, and the third radius of curvature TR3 satisfy the following relation:

TR1>TR2>TR3.

5. The pneumatic tire according to claim 3,
wherein the second radius of curvature TR2 is in a range of from 45% to 60% of the first radius of curvature TR1, and
wherein the third radius of curvature TR3 is in a range of from 15% to 30% of the first radius of curvature TR1.

6. The pneumatic tire according to claim 3,
wherein the first connecting portion is located within 2 mm from an axial center of the middle land portion, and
wherein the second connecting portion is located axially outwardly from an axially inner end of the shoulder land portion of from 5 to 10 mm.

7. The pneumatic tire according to claim 1, the tread portion being further provided with a belt layer,
the belt layer comprising an inner belt ply and an outer belt ply in a tire radial direction, and
an axial width of the outer belt ply being equal to or more than 60% of a tread width.

8. The pneumatic tire according to claim 2,
the tread portion further comprising a circumferentially and continuously extending crown main groove arranged on a tire equator and a circumferentially and continuously extending shoulder main groove arranged between the crown main groove and a tread edge to define a middle land portion between the crown main groove and the shoulder main groove, and a shoulder land portion between the shoulder main groove and the tread edge, and
on the contact patch upon being loaded with 40% of the standard tire load, an axial contact width of the shoulder land portion being in a range of from 130% to 140% of an axial contact width of the middle land portion.

9. The pneumatic tire according to claim 4,
wherein the second radius of curvature TR2 is in a range of from 45% to 60% of the first radius of curvature TR1, and
wherein the third radius of curvature TR3 is in a range of from 15% to 30% of the first radius of curvature TR1.

10. The pneumatic tire according to claim 4,
wherein the first connecting portion is located within 2 mm from an axial center of the middle land portion, and
wherein the second connecting portion is located axially outwardly from an axially inner end of the shoulder land portion of from 5 to 10 mm.

11. The pneumatic tire according to claim 5,
wherein the first connecting portion is located within 2 mm from an axial center of the middle land portion, and wherein the second connecting portion is located axially outwardly from an axially inner end of the shoulder land portion of from 5 to 10 mm.

12. The pneumatic tire according to claim 2,
the tread portion being further provided with a belt layer,
the belt layer comprising an inner belt ply and an outer belt ply in a tire radial direction, and an axial width of the outer belt ply being equal to or more than 60% of a tread width.

13. The pneumatic tire according to claim 2,
the tread portion being further provided with a belt layer,
the belt layer comprising an inner belt ply and an outer belt ply in a tire radial direction, and an axial width of the outer belt ply being equal to or more than 60% of a tread width.

14. The pneumatic tire according to claim 3,
the tread portion being further provided with a belt layer,
the belt layer comprising an inner belt ply and an outer belt ply in a tire radial direction, and an axial width of the outer belt ply being equal to or more than 60% of a tread width.

15. The pneumatic tire according to claim 4,
the tread portion being further provided with a belt layer,
the belt layer comprising an inner belt ply and an outer belt ply in a tire radial direction, and an axial width of the outer belt ply being equal to or more than 60% of a tread width.

16. The pneumatic tire according to claim 5,
the tread portion being further provided with a belt layer,
the belt layer comprising an inner belt ply and an outer belt ply in a tire radial direction, and an axial width of the outer belt ply being equal to or more than 60% of a tread width.

17. The pneumatic tire according to claim 2, wherein
upon being loaded with 40% of the standard tire load, a ground contact width W7 of the shoulder land portion is in a range of 130% to 140% of a ground contact widths W6 of the middle land portion.

18. The pneumatic tire according to claim 6, wherein
a circumferentially and continuously extending longitudinal sipe is provided at an axial location of the first connecting portion, and the sipe extends in parallel with a tire circumferential direction.

19. The pneumatic tire according to claim 2 wherein
the shoulder land portion is provided with shoulder lateral grooves and lateral sipes extending in a tire axial direction,
on the contact patch upon being loaded with 40% of the standard tire load, a circumferentially line extending on a location of the shoulder contact circumferential length Ls passes through the lateral sipes without passing through the shoulder lateral grooves, and
on the contact patch upon being loaded with 80% of the standard tire load, a circumferentially line extending on a location of the shoulder contact circumferential length Ls passes through the lateral sipes and the shoulder lateral grooves.

20. The pneumatic tire according to claim 1 wherein
on the contact patch upon being loaded with 40% of the standard tire load, a ratio Lc/Wm of the crown contact circumferential length Lc to an axial maximum width Wm of the contact patch is in a range of from 95% to 105%, and
the axial maximum width Wm of the tread portion is in a range of from 70% to 85% of a tread width TW that is an axial distance between tread edge of a contact patch of the tread portion under a standard loaded condition at zero camber angle.

* * * * *